(12) United States Patent
Uchikata

(10) Patent No.: US 7,438,369 B2
(45) Date of Patent: Oct. 21, 2008

(54) RECORDING APPARATUS HAVING A DEVICE FOR DETECTING THE PRESENCE OR ABSENCE OF A LIQUID

(75) Inventor: Yoshio Uchikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/178,374

(22) Filed: Jul. 12, 2005

(65) Prior Publication Data

US 2005/0264623 A1    Dec. 1, 2005

Related U.S. Application Data

(62) Division of application No. 09/452,186, filed on Dec. 2, 1999, now Pat. No. 7,172,259, which is a division of application No. 08/678,700, filed on Jul. 11, 1996, now Pat. No. 6,024,428.

(30) Foreign Application Priority Data

Jul. 14, 1995    (JP)    ............................... 1995-179156

(51) Int. Cl.
*B41J 2/195* (2006.01)
(52) U.S. Cl. .................................. 347/7; 347/85; 347/86
(58) Field of Classification Search ........................ 347/7, 347/86, 85, 19, 5, 9; 250/573
See application file for complete search history.

(56) References Cited

U.S. PATENT DOCUMENTS

| 4,246,489 | A |   | 1/1981  | Yoshida et al. | ............... 250/577 |
| 4,490,731 | A | * | 12/1984 | Vaught        | ............... 347/88  |
| 4,636,814 | A |   | 1/1987  | Terasawa      | ............... 347/86  |
| 4,788,444 | A |   | 11/1988 | Williams      | ............... 250/577 |
| 4,809,551 | A |   | 3/1989  | Grossiord     | ............... 73/327  |
| 4,970,533 | A |   | 11/1990 | Saito et al.  | ............... 346/140 R |
| 5,136,305 | A |   | 8/1992  | Ims           | ............... 346/1.1 |
| 5,255,019 | A |   | 10/1993 | Mochizuki et al. | ............ 347/7 |
| 5,400,573 | A |   | 3/1995  | Crystal et al. | ............... 53/468 |
| 5,406,315 | A |   | 4/1995  | Allen et al.  | ............... 347/7  |
| 5,552,816 | A |   | 9/1996  | Oda et al.    | ............... 347/86 |
| 5,604,523 | A | * | 2/1997  | Tsukuda et al. | ............... 347/86 |
| 5,616,929 | A |   | 4/1997  | Hara          | ............... 347/7  |
| 5,682,189 | A |   | 10/1997 | Takagi        | ............... 347/87 |

(Continued)

FOREIGN PATENT DOCUMENTS

DE    34 08 302    9/1985

(Continued)

*Primary Examiner*—Lam S Nguyen
(74) *Attorney, Agent, or Firm*—Fitzpatrick, Cella, Harper & Scinto

(57) ABSTRACT

A device for detecting the presence or absence of a liquid, which is installed on an ink-jet recording apparatus, is configured to determine the presence or absence of ink in the ink flow path by detecting the reflection of light from a light transmission portion by irradiating light thereon. The light transmission portion is formed on at least a part of the ink path wall that forms the ink flow path for supplying ink to the recording head. As a result, it becomes possible for responding to consumer demands of designing a smaller version of the ink tank, a cost effective production thereof, and the like in addition to provide images with excellent image qualities.

6 Claims, 13 Drawing Sheets

U.S. PATENT DOCUMENTS

| | | | |
|---|---|---|---|
| 5,997,121 A | 12/1999 | Altfather et al. | 347/7 |
| 6,012,795 A | 1/2000 | Saito et al. | 347/7 |
| 6,024,428 A | 2/2000 | Uchikata | 347/7 |
| 6,137,503 A | 10/2000 | Hashimoto et al. | 347/19 |

FOREIGN PATENT DOCUMENTS

| | | |
|---|---|---|
| EP | 0 546544 A2 * | 6/1993 |
| EP | 0 573 274 | 12/1993 |
| EP | 7 218 321 | 8/1995 |
| FR | 2 672 390 | 8/1992 |
| JP | 60-90767 | 5/1985 |
| JP | 60-172546 | 9/1985 |
| JP | 62-21549 | 1/1987 |
| JP | 5-332812 | 12/1993 |
| JP | 7-32604 | 2/1995 |
| JP | 7-117238 | 5/1995 |
| JP | 7-164626 | 6/1995 |

* cited by examiner

RECORDING APPARATUS HAVING A DEVICE FOR DETECTING THE PRESENCE OR ABSENCE OF A LIQUID

This is a divisional application of application Ser. No. 09/452,186, filed on Dec. 2, 1999, issued as U.S. Pat. No. 7,172,259, which is a divisional application of application Ser. No. 08/678,700, filed on Jul. 11, 1996, now issued as U.S. Pat. No. 6,024,428.

BACKGROUND OF THE INVENTION

1. Field of the Invention

The present invention relates to an ink-jet recording method, an ink-jet recording apparatus, an ink tank to be removably mounted on such apparatus, and an ink-supplying means for supplying ink to the ink tank, which make possible to obtain a high-quality image on a recording medium. In addition, the present invention also relates to recording systems including a copying machine, a facsimile, and a printer, and also a word processor and a personal computer integral with a recording device, and a recorded material provided as a recording medium on which an image is recorded by the recording apparatus.

2. Related Art

Heretofore, ink-jet recording apparatuses have been used as output means on the commercial basis, for example they have been used as printers as output means of recording systems such as output devices of copying machines, facsimiles, electronic typewriters, and word processors, output terminals of work stations, and the like, and also such as handy- or portable-type printers equipped in information-processing systems such as personal computers and host computers, optical disk apparatuses, video apparatuses, and so on. In these cases, each of the ink-jet recording apparatuses is configured to meet a specific function, a usage pattern, and the like of the corresponding apparatus.

As a general ink-jet recording apparatus, it has been known that one comprises a recording device (recording head), an ink tank for storing ink to be supplied to the head, a sheet-feed device for feeding recording paper, and a control device to control these devices. The recording head that discharges ink droplets from a plurality of nozzles is serially moved or scanned in a direction (main-scanning direction) perpendicular to a direction of feed (sub-scanning direction). The ink-recording head performs a recording movement, in which the recording paper is intermittently fed a distance equal to the recorded width during non-recording intervals. In the case of a configuration of the ink-jet recording apparatus that uses an on-demand type recording head by which ink is ejected onto the recording paper according to recording signals, it has been widely used because of the advantages of low running cost and quietness. In the case of a configuration of the ink-jet recording apparatus that uses a full-line type recording head in which a plurality of nozzles for ejecting ink is arranged linearly in the sub-scanning direction, the recording head need only scan the recording paper once to perform recording of a width corresponding to the number of nozzles. This makes for increased speed of recording operation.

The supply of ink deteriorates in quality when the remaining quantity of ink in an ink storage member such as the ink tank described above is lower than a predetermined level. As a consequence, a poor printed output may be obtained and so high-quality image formation becomes difficult. If the tank becomes completely empty of ink, furthermore, an image cannot be formed on the paper while ink-ejecting means of the recording head is driven in spite of the absence of ink. In this case, therefore, the possibility exists of causing a failure of the ink-ejecting means. Especially in the case of using a heater for ejecting ink, as is described later, the possibility exists of destroying the whole structure of the recording head by the effect of abnormal heat-up. Conventionally, therefore, ink-jet recording apparatuses have a device for detecting the presence or absence of a liquid (hereinafter, also referred to as a liquid-detecting device), as shown in FIG. 1.

The liquid-detecting device shown in FIG. 1 comprises a cylindrical rod 1001, a light source 1003 connected with the rod 1001, and a light-receiving unit (i.e., a photosensor). In this kind of the device configuration, the rod 1001 is in the type of having light transmission properties and also having a tip portion which is cut in a slanting direction. As shown in the figure, the rod 1001 is arranged in an ink tank 1002. The light source 1003 emits light toward a bottom of the ink tank 1002 through the tip portion of the rod 1001. In the case that the distance between the tip portion of the rod 1001 and the bottom of the ink tank 1002 is kept at a constant, the following conditions can be observed:

the condition that the tip portion of the rod 1001 is immersed in ink I (e.g., ink level is indicated by a solid line A higher than the tip portion);

the condition that there is a space between the tip portion of the rod 1001 and ink level (e.g., ink level is indicated by a solid line A' lower than the tip portion); and the condition of empty out the ink tank 1002.

Under each of these conditions, reflected light having its own refractive index can be detected. Therefore, through the use of the differences in refractive indexes under the above conditions the presence or absence of ink can be determined by detecting whether the ink level is positioned between the tip portion of the rod 1001 and the bottom of the ink tank 1002. Thus the photosensor 1004 receives the reflected light passing through the tip portion of the rod 1001, and then the condition of the remaining quantity of the ink is determined by the control unit 1005 connected with the photosensor 1004. If the control unit 1005 makes a decision that the remaining quantity of the ink is lower than the predetermined quantity, the operator is instructed to change or fill the ink tank by means of an indicator on an operation panel (not shown) which is electrically connected to the control unit 1005.

However, in accordance with the conventional ink-detecting method described above, light emitted from the light source 1004 is reflected at an inner peripheral side wall of the rod 1001, so that it is difficult to keep a constant incidence angle of reflected light against a slant portion of the rod 1001 does not remain constant. It results in the problem that the difference between the strength of reflected light in the presence of ink and the strength of reflected light in the absence of ink cannot be broadly divided. In addition, it also results in the problem that the device configuration increases in complexity because of installing the rod 1001 in the ink tank (i.e., an ink-flow path of the ink tank). Furthermore, it is difficult to respond to consumer demands, such as for smaller and cheaper devices, to a sufficient degree because of enlarged volume and limited shape of the ink tank as a result of arranging the rod therein.

SUMMARY OF THE INVENTION

An object of the present invention is to provide an ink-jet recording apparatus that performs a detection of the presence or absence of ink at a low cost with reliability.

In a first aspect of the present invention, there is provided a device for detecting the presence or absence of a liquid, installed on an ink-jet recording apparatus on which a recording head and an ink tank for supplying ink to the recording head are fixed or removably mounted, comprising:

a light-emitting unit for emitting light to a light transmitting portion having at least a part where a ridge portion or groove portion in the shape of V in cross section are formed on the ink tank;

a detecting unit for detecting light which is reflected off the light transmitting portion; and a means for transmitting the results obtained by the detecting unit to a control unit of the ink-jet recording apparatus.

In a second aspect of the present invention, there is provided an ink tank for supplying an ink to a recording means, which is fixed on or removably mounted on a recording apparatus for recording an input image information on a recording medium by using the recording means that ejects ink, comprising:

an ink-storing portion for storing ink, provided as an ink-flow path for supplying ink to the recording means;

a front end portion on which an ink-supplying opening for supplying the ink to the recording means;

a rear end portion formed on the other side of the ink tank with respect to the front end portion;

a side surface portion on which a window portion made of a light-transmitting material; and other side source portions for surrounding the ink-storing portion in conjunction with the side surface portion.

Here, the window portion may be formed by cutting at least a part of the side surface portion into a groove portion in the shape of V in cross section.

The window portion may be made of at least one ridge portion in the shape of V in cross section.

In a third aspect of the present invention, there is provided a recording apparatus for recording an input image information on a recording medium by using a recording means for ejecting ink, comprising:

a carriage on which an ink tank having a window portion of a light-transmitting material on at least one side surface thereof is fixed or removably mounted;

a device for detecting the presence or absence of a liquid, which are arranged in a position facing to the window portion of the ink tank mounted on the carriage; and a control unit for determining the presence or absence of ink in accordance with the results obtained by the device for detecting the presence or absence of a liquid.

Here, the device for detecting the presence or absence of a liquid may comprise a light-emitting unit and a light-receiving unit.

The window portion may be formed by cutting at least a part of the side surface portion into a groove portion in the shape of V in cross section.

The window portion may be made of at least one ridge portion in the shape of V in cross section.

The control unit may determine the presence or absence of ink in the ink tank in accordance with the presence or absence of a total reflection of light emitted from the light-emitting unit to the window portion.

The device for detecting the presence or absence of a liquid may be used as a device for determining whether the ink tank is mounted on the carriage or not.

The recording means may use an electrothermal transducer for generating thermal energy required for allowing a phenomenon of film boiling to appear in ink in order to eject ink therefrom.

In a fourth aspect of the present invention, there is provided a recording system, comprising:

an information processing unit for processing input information;

an output unit for recording an output of the information processing unit on a recording medium; and a control unit for controlling an operating condition of the output unit, wherein the output unit having:

a carriage on which an ink tank having a window portion of a light-transmitting material on at least one side surface thereof is fixed or removably mounted;

a device for detecting the presence or absence of a liquid, which are arranged in a position facing to the window portion of the ink tank mounted on the carriage; and a control unit for determining the presence or absence of ink in accordance with the results obtained by the device for detecting the presence or absence of a liquid.

In a fifth aspect of the present invention, there is provided a kit comprising an ink tank, a recording means to be connected with the ink tank, an ink refill means for refilling ink into the ink tank, wherein the ink tank is for supplying an ink to a recording means, which is fixed on or removably mounted on a recording apparatus for recording an input image information on a recording medium by using the recording means that ejects ink, and comprises:

an ink-storing portion for storing ink, provided as an ink-flow path for supplying ink to the recording means;

a front end portion on which an ink-supplying opening for supplying the ink to the recording means;

a rear end portion formed on the other side of the ink tank with respect to the front end portion;

a side surface portion on which a window portion made of a light-transmitting material; and other side source portions for surrounding the ink-storing portion in conjunction with the side surface portion.

In a sixth aspect of the present invention, there is provided a kit, wherein the recording means is an ink-jet recording head that uses an electrothermal transducer for generating thermal energy required for allowing a phenomenon of film boiling to appear in ink in order to eject ink therefrom.

In a seventh aspect of the present invention, there is provided a recording unit comprising an ink tank and a recording means to be connected with the ink tank, wherein the ink tank is for supplying an ink to a recording means, which is fixed on or removably mounted on a recording apparatus for recording an input image information on a recording medium by using the recording means that ejects ink, and comprises:

an ink-storing portion for storing ink, provided as an ink-flow path for supplying ink to the recording means;

a front end portion on which an ink-supplying opening for supplying the ink to the recording means;

a rear end portion formed on the other side of the ink tank with respect to the front end portion;

a side surface portion on which a window portion made of a light-transmitting material; and other side source portions for surrounding the ink-storing portion in conjunction with the side surface portion.

The recording means may be an ink-jet recording head that uses an electrothermal transducer for generating thermal energy required for allowing a phenomenon of film boiling to appear in ink in order to eject ink therefrom.

In an eighth aspect of the present invention, there is provided a device for detecting the presence or absence of a liquid, installed on an ink-jet recording apparatus on which a recording head and an ink tank for supplying ink to the recording head are fixed or removably mounted, comprising:

a window portion formed on at least a part of a wall of the ink tank;

a light-emitting unit for emitting light to the window portion; and a light-receptor unit for receiving light which is reflected off an inner wall surface of the window portion after emitting from the light-emitting unit, wherein a shape of the inner wall surface of the window portion is different from a shape of an inner wall surface of the ink tank around the window portion.

Here, the inner surface of the window portion may be shaped so as to introduce light emitted from the light-emitting unit into an interface between the ink and the ink tank at a predetermined angle, and the light-receptor unit is positioned on a path of light reflected from the interface between the ink and the ink tank after emitting from the light-emitting unit.

The light-emitting unit may be positioned so as to introduce light into the window portion, perpendicularly.

The inner wall surface of the window portion may be shaped so as to introduce incident light from the light-emitting unit into the interface of the ink and the ink tank at an angle of 45° C.

In the following description, the term "recording" means that all kinds of the procedure for proving ink on ink supports such as cloth, yarn, paper, and other sheet materials (i.e., printing process, image-forming process, copying process, dye or staining process, and the like). Therefore the field of the invention is not limited to the field of information-processing, and so it is also applicable to other fields including apparel industries using the ink supports for receiving ink such as cloth, yarn, paper, and other sheet materials.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

An ink tank as an ink-holding member to be mounted in a recording apparatus according to the present invention, comprises an ink-storing chamber, a front end portion in which an ink-supplying portion is formed for supplying ink to a recording means (hereinafter, also referred as a recording head) connected therewith, a posterior end portion in which an air-communicating port is formed to make a communication between the above ink-holding means and the air, a side wall portion (hereinafter, referred as an ink-flow path parallel to a direction of supplying ink to the recording head, and a window made of a light-transmitting material on a front end side of the side wall portion. According to the present invention, furthermore, a device for detecting the presence or absence of a liquid is installed in the recording apparatus for detecting the presence or absence of the remaining ink in the tank. Preferred embodiments of the present invention will be described below in a concrete manner.

Embodiment 1

Figure 1:
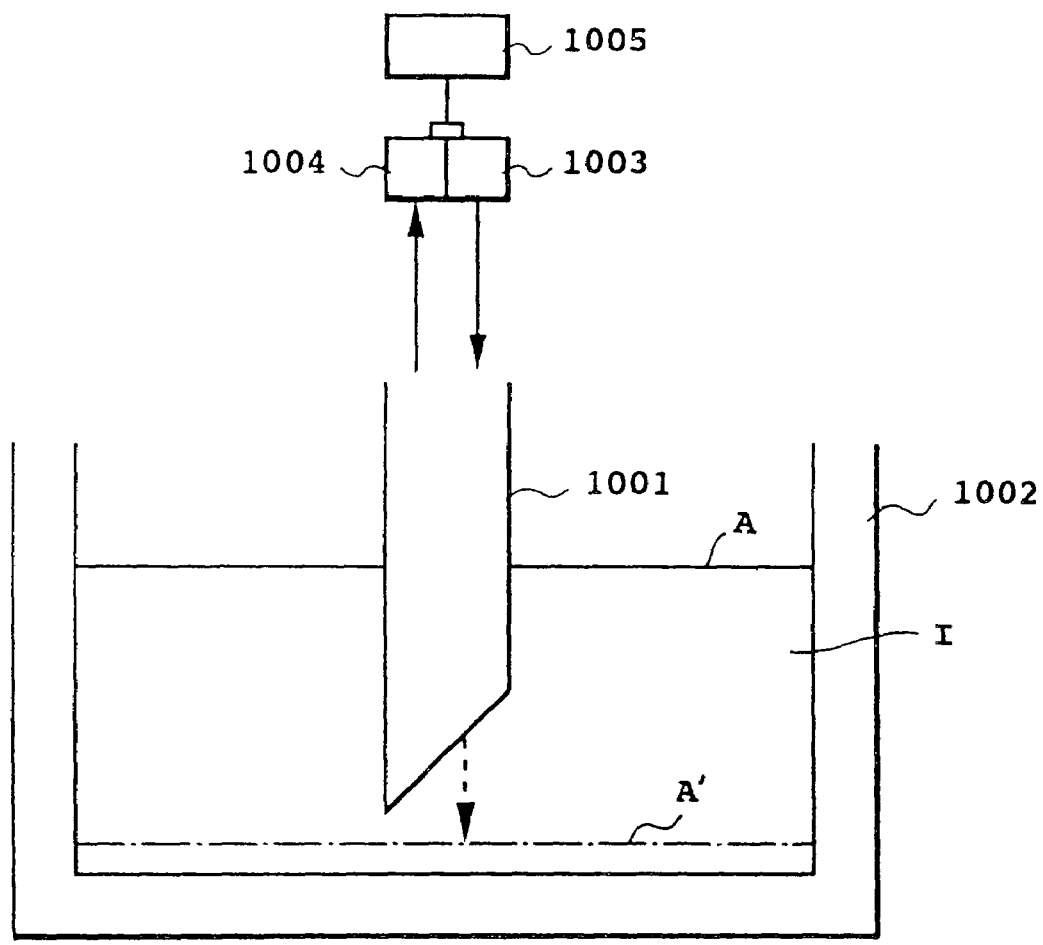
FIG. 1 is a schematic illustration of a conventional device for detecting the presence or absence of a liquid in a container.
Figure 2:
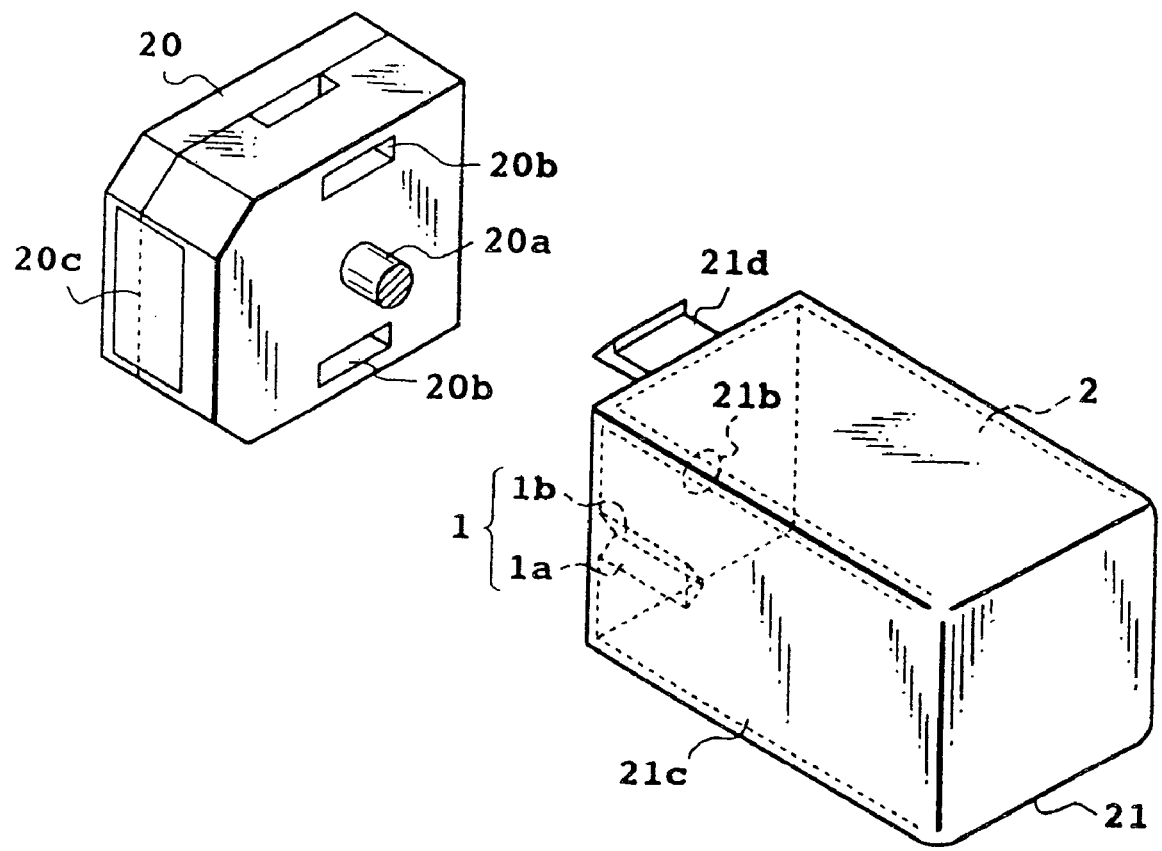
FIG. 2 is a perspective illustration of a recording unit to be mounted on an ink-jet recording apparatus in accordance with the present invention.

FIG. 2 is a perspective illustration of a recording unit to be mounted on an ink-jet recording apparatus in accordance with the present invention. The recording unit has a single-piece construction in which an ink-jet recording head 20 is integral with an ink tank 21 in a removable manner.

The ink-jet recording head 20 comprises an ink inlet portion 20a and an ink ejecting portion 20c communicated therewith. In this embodiment, the ink-jet recording head 20 uses electro-thermal conversion elements (hereinafter, referred to as heaters) as energy-generating means. As a result, a bubble is formed in the ink by a pulse of an electric drive signal provided from the system unit of the ink-jet recording apparatus, and in an instant the growth and collapse of the bubble occurs in a suitable manner, resulting that it is particularly suited for an ejection of ink-droplet because of significant response properties thereof. Thus, it is possible to make the ink-jet recording head easily as compact as possible by using the electro-thermal converting elements as the energy generating means. Another advantage is that the recording head using the electro-thermal conversion elements can be fully fabricated with a process utilizing technical advances made in the semiconductor fields in recent years and technical merits of IC and microfabrication technologies with remarkable technical advances and improved reliabilities, thus making high density fabrication easy and reducing manufacture cost in addition to further miniaturization of the recording head.

On the other hand, the ink tank 21 comprises an ink-holding chamber 2 for reserving ink to be supplied to the ink-jet recording head 20 and an opening as an ink outlet portion 21b formed on a front end portion thereof into which the ink inlet portion 20a of the ink-jet recording head 20 can be fitted. As shown in the figure, there is a pair of projections 21d from the front end and they have hooks on their free ends so as to be able to engage in a pair of holes 20b formed on the end portion of the ink-jet recording head 20 from which the ink-inlet portion 20a is protruded. Furthermore, at least one side surface (i.e., an ink-flow wall) 21c of the ink tank 21 is made of a transparent material (e.g., transparent plastics and glasses), and also a grooved portion is formed on the front side thereof. Or to put it another way: the grooved portion is formed as a rise of an inner side of the ink tank 21 so as to have a V-shaped cross section. In this embodiment, therefore, the grooved portion is provided as a window having two inclined surfaces 1a, 1b.

For illustrating the ink tank in brief, an ink-induction member and an ink-absorbing member are not shown in the figure. This embodiment, however, is not limited to such configuration. It is also possible to provide other configurations of the ink tank having such window, for example one having the ink-induction member and the ink-absorbing member, or of separating the ink-holding chamber into two parts (i.e., one for containing these members and the other for containing ink). The window may be positioned in accordance with the construction of the ink tank.

Figure 3:
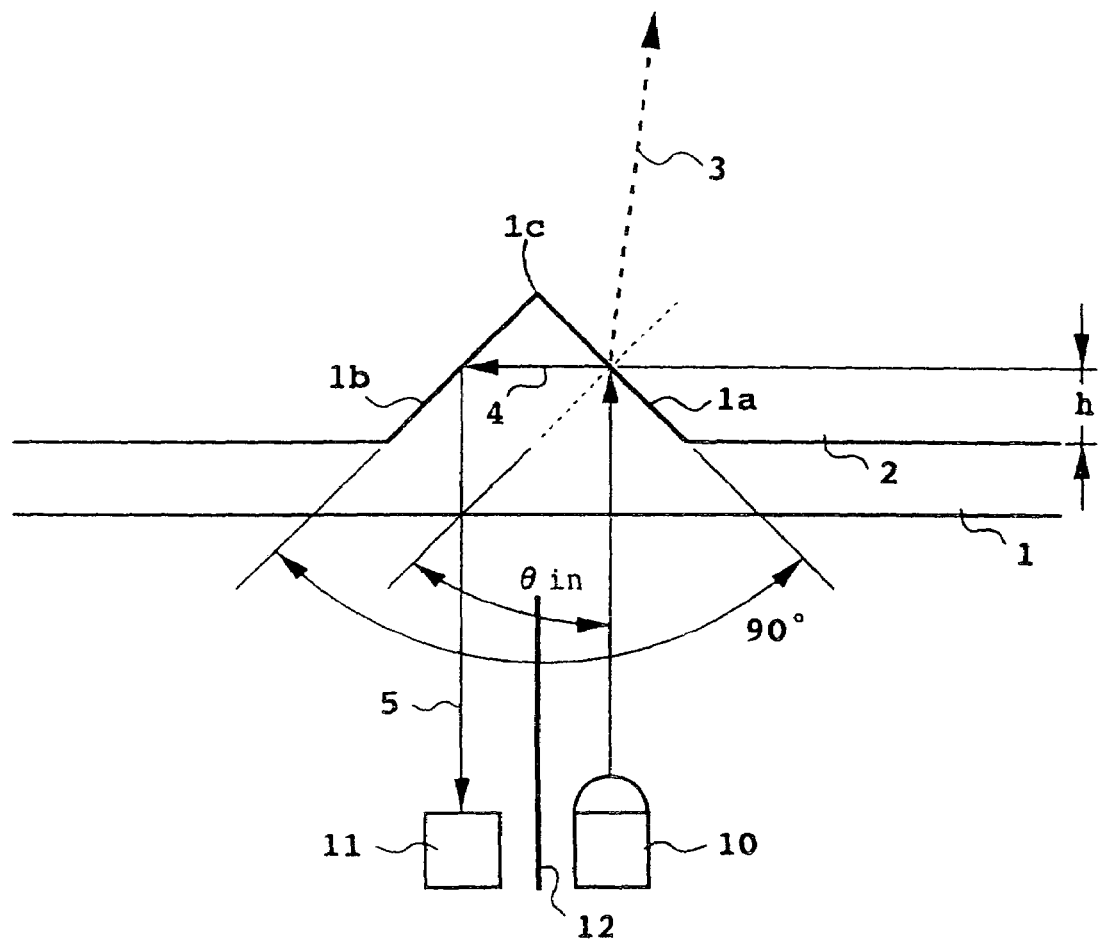
FIG. 3 is a schematic illustration of a window portion of an ink tank and a device for detecting the presence or absence of ink, where the device comprises a light-emitting unit to emit light to the window portion and a light-receiving unit to detect reflected light.

FIG. 3 is a schematic illustration of the window of the ink tank shown in FIG. 2 and an ink-detecting assembly for detecting the presence or absence of ink in the ink tank. The components that make up the assembly include a photo-emitting member 10 for illuminating light toward the window 1 of the ink tank 21 and a photo-receptor member 11 for detecting reflected light.

The ink-detecting assembly can be positioned so as to face to the above window 1 when it is mounted on a carriage of the ink-jet recording apparatus (or a recording unit is positioned at a home position thereof).

The photo-emitting member 10 is in the type of a high directivity and generates a beam of light substantially without an attenuation thereof in the ink. Thus the photo-emitting member 10 may be an illumination element having a light-gathering power by means of a lens or the like with respect to infrared light or near infrared light to illuminate a beam of light with a high directivity. The beam of light emitted from the photo-emitting member 10 is introduced into the inclined surface 1a at a substantially constant angle θin.

In this embodiment, by the way, the components of ink stored in the ink holding chamber 2 include glycol, alcohol, dye stuff, and the like in addition to 80% or more of water. This kind of ink has a refractive index n-ink of 1.3 to 1.4, almost the same order as that of water. On the other hand, the wall of ink-flow path may be made of a transparent plastic or glass material, having a refractive index n-wall of 1.5 to 1.6. In addition, air has a refractive index n-air of approximately 1.0003. Therefore, in the case that a substantial amount of ink is found in the ink flow path, a critical angle θ1 to cause a total reflection against the incident light at the inclined surface 1a can be calculated by the following formula (1) and results in the critical angle θ1 of 54 to 69.

$$\sin(\theta 1) = n\text{-ink}/n\text{-wall} = (1.5\sim1.6)/(1.3\sim1.4) \quad (1)$$

In the case of the absence of ink in the ink flow path, a critical angle θ2 to cause a total reflection against the incident light at the inclined surface 1a can be calculated by the following formula (2) and results in the critical angle θ2 of 39 to 42.

$$\sin(\theta 2) = n\text{-air}/n\text{-wall} = 1.003/(1.5\sim1.6) \quad (2)$$

In the case that the incident angle θin to the inclined surface 1a is in the range of 43 to 53, consequently, a total reflection cannot occur in the presence of ink while it can occur in the absence of ink. Thus the present embodiment is configured to define the incident angle θin=45°. Accordingly, in the case that a substantial amount of ink is present in the tank the incident light passes through the window 1 and travels along a light path 3. In the case that a substantial amount of ink is not present in the tank, on the other hand, the incident light does not pass through the window 1, while it is reflected from the inclined surface 1a and travels along a light path 4. Then the light passing through the light path 4 is total-reflected by the inclined surface 1b and then travels along the light path 5 extending to the photoreceptor member 11.

The presence or absence of ink in the ink path can be detected with stability according to the relationship among the light intensities indicated by the following inequality:

A>B>C wherein A represents an intensity of light detected by the photo-receptor member 11 when ink is not present in the ink path, B represents an intensity of light detected by the photo-receptor member 11 when ink is present in the ink path, and C represents an intensity of light detected by the photo-receptor member 11 when the ink path is not found (i.e., the ink tank is not mounted on the carriage). The difference between A and B is comparatively large, so that the presence or absence of ink in the ink path can be detected with stability by the differences among the light-intensities of the light introduced into the photo-receptor portion 11. In this case, by the way, the difference between B and C is comparatively small. However, the detection of the presence or absence of ink in the ink tank can be performed by improving the detection-sensitivities of the photo-receptor 11.

In the figure, "h" represents a height of an ink surface at the position lower than the tip 1c of the V-shaped portion formed on the window 1, where the light beam from the photo-emitting member 10 comes into contact with the inclined surface 1a. A total reflection of the light beam can occur when the ink surface is lower than h by consuming the ink, so that h is responsible for determining a detection point for regarding the ink-path (or the ink tank) as empty whether a small amount of ink is remains or not. Therefore, it is possible to change the above height h by shifting the position of the photo-emitting portion 10 to shift a point on which the light beam from the photo-emitting portion 10 comes into contact with the inclined surface 1a.

In the figure, reference numeral 12 is a douser for preventing the incidence of light from the photo-emitting portion 10 to the photo-receptor portion 11, by which the reflected beam can be detected with stability when the photo-emitting portion 10 consists of a cheap photo-emitting element such as a light-emitting diode (LED). For improving the straight-traveling properties of light, furthermore, the light emitted from the light-emitting member 10 may be introduced into the ink-flow path after passing through a slit (not shown) to travel in a straight line. A hydrophilic treatment may be performed on the ink-flow wall for preventing a deposition of bubbles thereon with effect.

By the way, the present invention is configured to utilize a refractive index of the ink, so that the results of the detection described above is hardly susceptible to the variations in colors of ink. It means that the above means for detecting the presence or absence of ink in the ink path can be utilized in a color printer or the like, with respect to all of different colors used therein.

Figure 4:
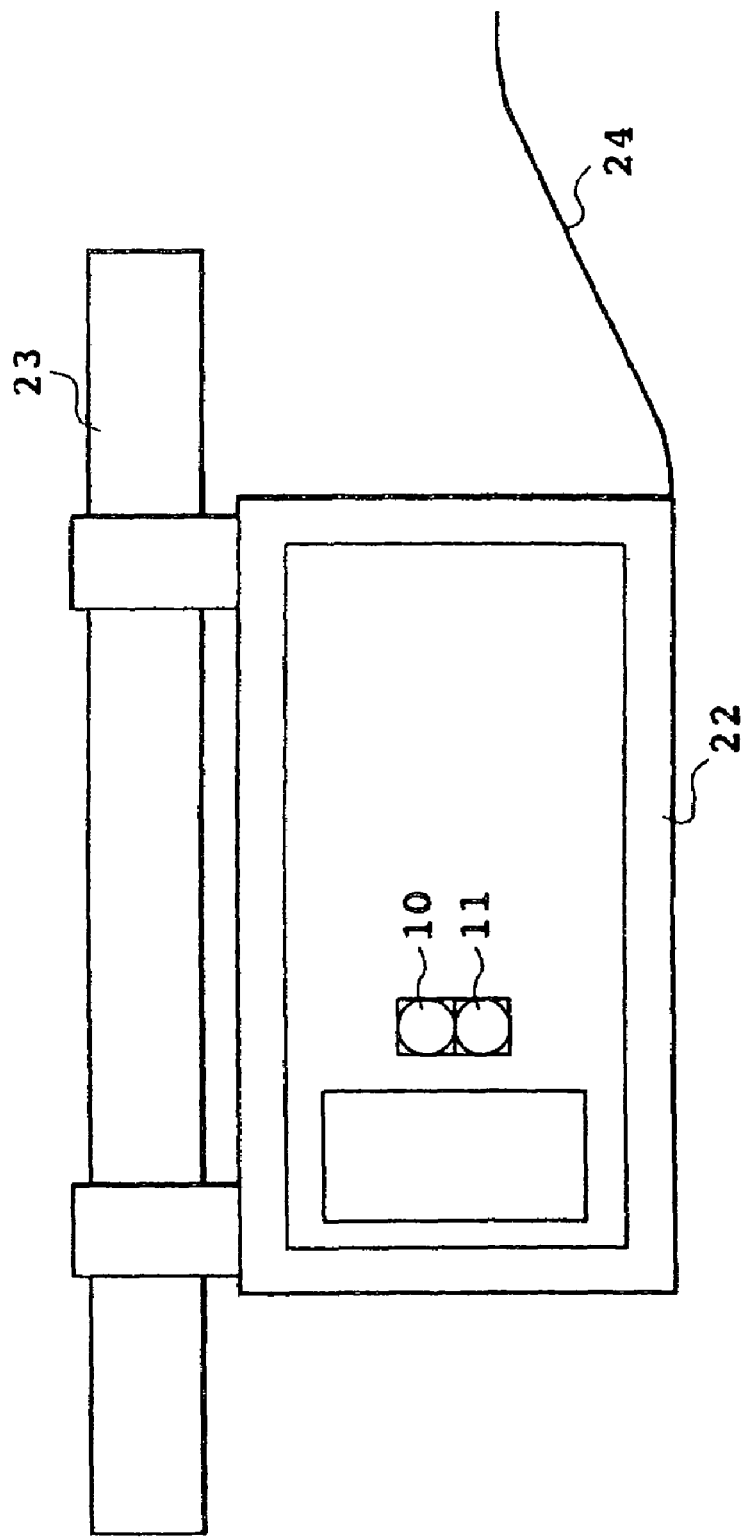
FIG. 4 is a schematic illustration of a carriage and a carriage-guide shaft for slidably supporting the carriage to be applied in an ink-jet recording apparatus of the present invention, where the carriage moves along the carriage-guide shaft in the main-scanning direction.

FIG. 4 is a schematic illustration of a carriage 22 and a carriage-guiding axis 23. As described above, the recording unit has a single-piece construction in which an ink-jet recording head 20 is integral with an ink tank 21 in a removable manner. The carriage-guiding axis 23 is responsible to hold the carriage in a slidable manner, on which the carriage moves in the sub-scanning direction.

The ink-jet recording head 20 has a positioning portion (not shown) and a flexible base board (electric connecting portion) for electrically connecting to the carriage 22. By using such devices, therefore, the ink-jet recording head 20 can be mounted on the carriage 22 with an electric connection therebetween.

Figure 5:
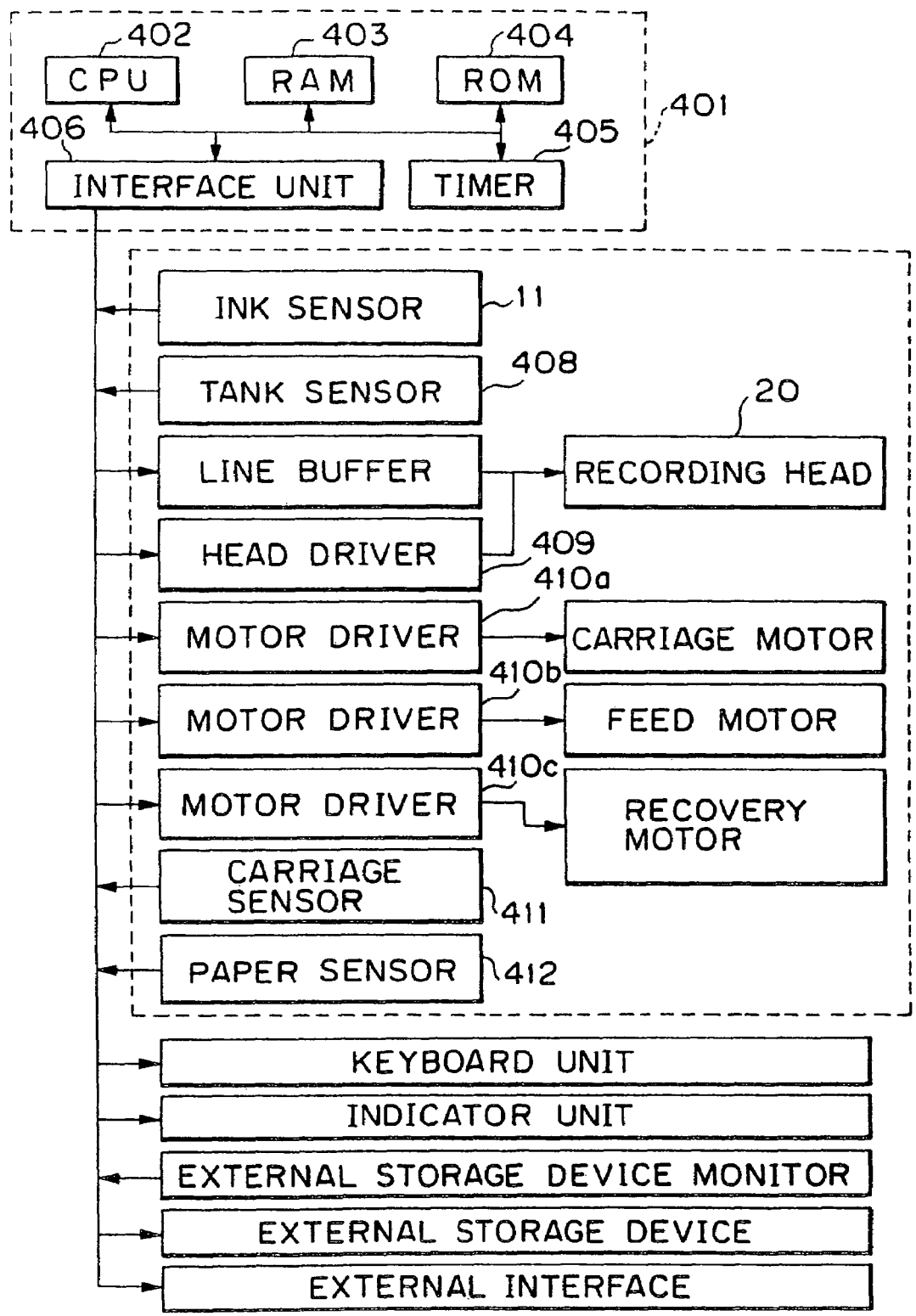
FIG. 5 is a block diagram of electric circuit to be applied in an ink-jet recording apparatus of the present invention.

An electric circuit of the ink-jet recording apparatus is constructed as described in the follows and shown in a block diagram of FIG. 5. In the figure, the same components as illustrated in the other figures are indicated by the same reference numerals, and also their duplicated explanations are eliminated in the following description. In the figure, furthermore, reference numeral 401 denotes a controller as a main control unit, 402 denotes, a central processing unit (CPU) in the shape of one used in, for example a micro-computer, 403 denotes a random access memory (RAM) having a region for expanding text data or image data, a work region, and so on, 404 denotes a read only memory (ROM) in which stationary data such as program data and font data are stored, 405 denotes a timer responsible for making execution cycles of the CPU 402 and for producing timings to be required in a recording movement by the printer unit, and 406 denotes an interface portion for connecting signals of the CPU 402 with the peripheral devices. Furthermore, reference numeral 407 denotes a controller of the printer unit 407, and 11 denotes a light-receptor unit shown in FIG. 2. Reference numeral 408 denotes an ink tank sensor for making sure the presence or absence of the ink tank, 409 denotes a head driver for sending recording signals, electric powers, and so on to the ink-jet recording head 20, 410a, b, and c denote motor drivers for sending signals, electric powers, and so on to be required for motors of moving the carriage, feeding the recording paper, driving the recovering system, and so on, respectively, 411 denotes a carriage sensor for detecting a location of the carriage and determining, for example whether the carriage is located at a home position or not, 412 denotes a paper sensor for detecting the presence or absence of a sheet of paper to avoid a recording on non-recording areas thereof or other components when the recording paper is not appropriately provided or when a last sheet of paper is recorded.

In the configuration described above, a warning against the remaining quantity is performed if the ink detecting unit detects the absence of ink in the ink tank. In this case, the remaining quantity of ink in the ink tank can be estimated almost accurately at the time of detecting the absence of ink in the ink tank (i.e., at the time of warning against the remaining quantity) because the detecting means comes to a conclusion that the ink is absent when the ink surface is under the predetermined ink level. Therefore, it may be configured so as to output an ink-less error after determining that the amount of ink consumed is reached at the predetermined level by calculating the consumption of ink at the events of recording, primary ejection, absorption, and the like which are performed after the output of ink-less error. Furthermore, it may be also configured so as to inhibit the movements of recording, absorbing, and the like after the output of ink-less error. The data concerned with the remaining quantity of the ink is stored in the RAM 402 described above, and so it is preferable that the RAM 402 is in the type of nonvolatile.

Embodiment 2

Figure 6:
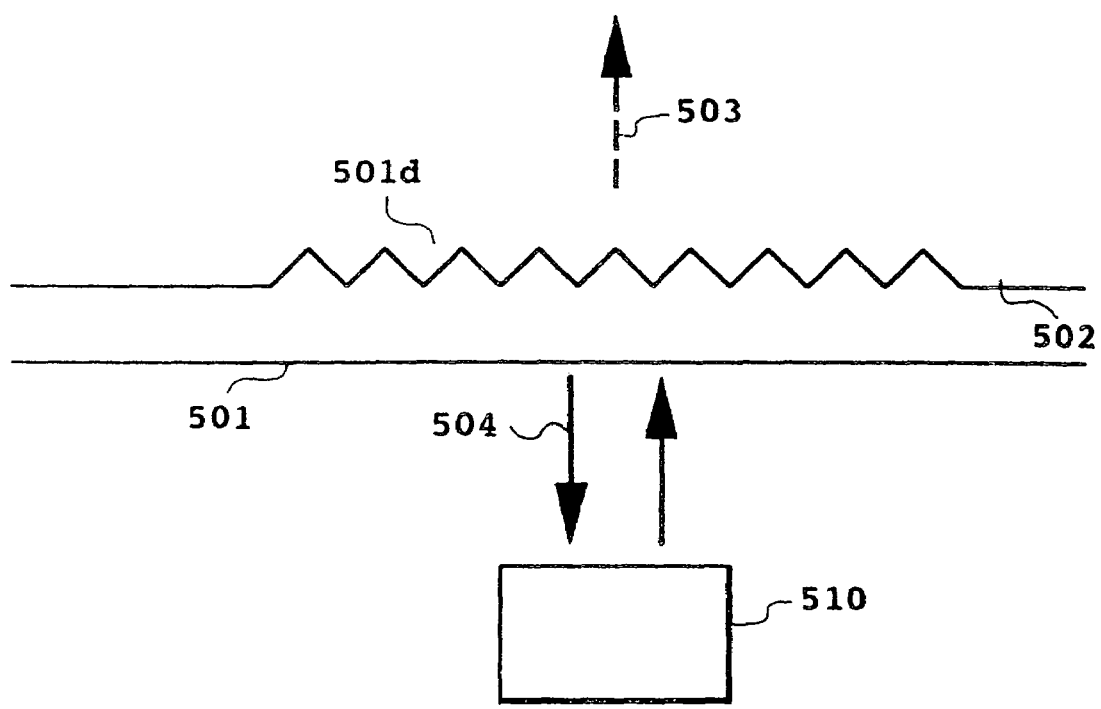
FIG. 6 is a cross-sectional view of an ink tank and a device for detecting the presence or absence of ink to be applied in an ink-jet recording apparatus as one of the preferred embodiments of the present invention.

FIG. 6 is a schematic section view of an ink tank and an ink-detecting unit of the ink-jet recording apparatus as a second preferred embodiment of the present invention. An ink-flow wall 501 has a plurality of inclined surfaces 501d formed as a sawtooth in cross section. Therefore, it is configured to perform a stable detection of total reflected light or transmitted light depending on the presence or absence of ink at the inclined surfaces 501d in the event that the light emitted from the light-emitting unit 510 is diffused to an extent. The light emitted from the light-emitting unit 510 is introduced into the plurality of inclined surfaces 501d. If the ink is in the ink-flow path 502, the light passes through the inclined surfaces 501d and then travels along a light path 503. If the ink-flow path 502 holds no ink but only air, the inclined surfaces 501d reflect the light perfectly and the reflected light travels along a light path 504. By the construction shown in FIG. 6, furthermore, it is possible to change the height of the inclined surfaces 501d to meet the user's needs. In addition, there is no possibility of generating any irregularity of the light reflection to be caused by a scratch on an inclined portion because the plurality of inclined surfaces 501d is formed also on the inner side of the ink tank.

Embodiment 3

Figure 7:
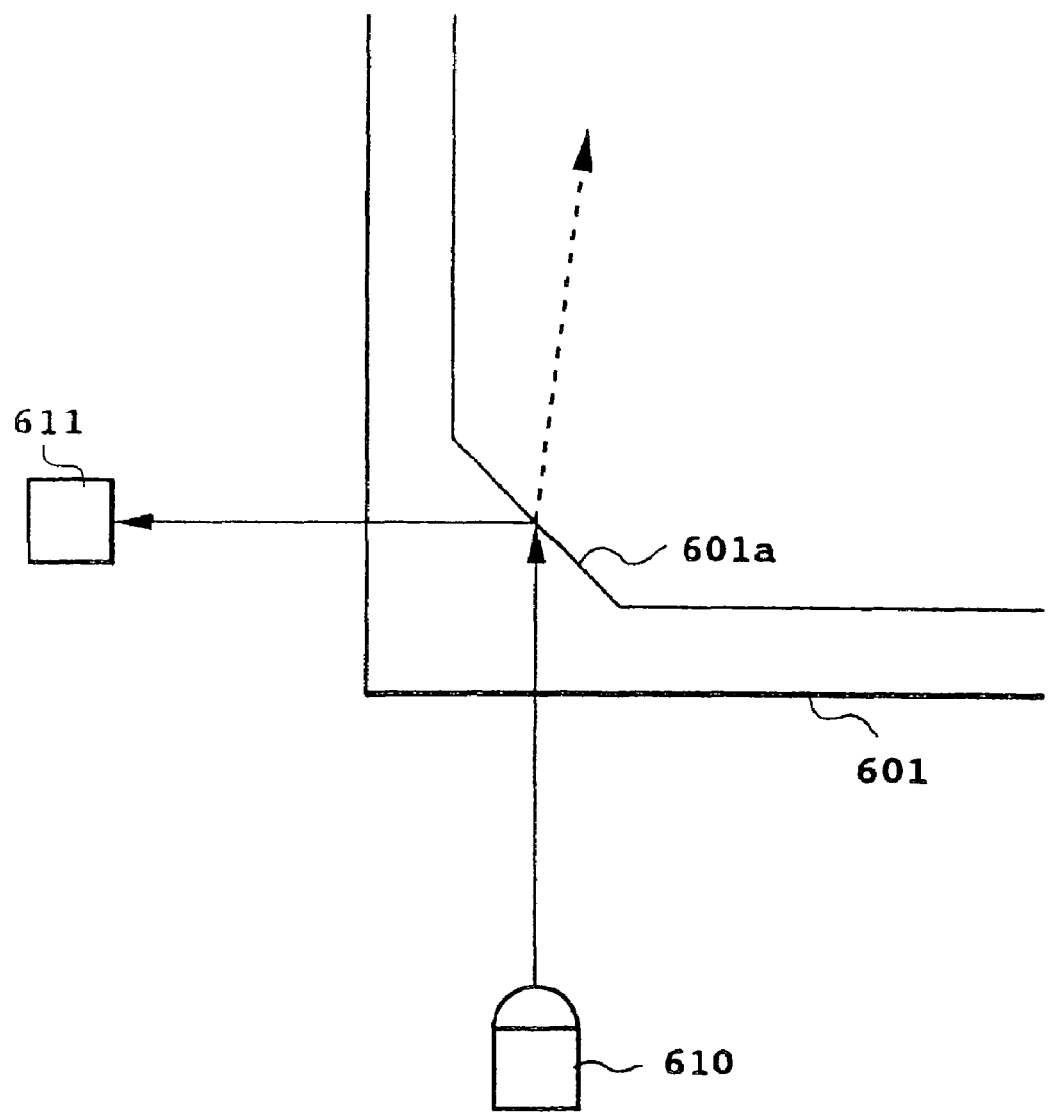
FIG. 7 is a schematic cross-sectional view of an ink tank and a device for detecting the presence or absence of ink to be applied in an ink-jet recording apparatus as one of the preferred embodiments of the present invention.

FIG. 7 is a schematic section view of an ink tank and an ink-detecting unit of the ink-jet recording apparatus as a third preferred embodiment of the present invention. An inclined surface 601a is formed on a corner (at a front-end side) of an ink-flow wall 601, so that an ink tank of a simple shape can be provided so as to have a high degree of flexibility in formation of the inclined surface at an appropriate portion.

Embodiment 4

Figure 8:
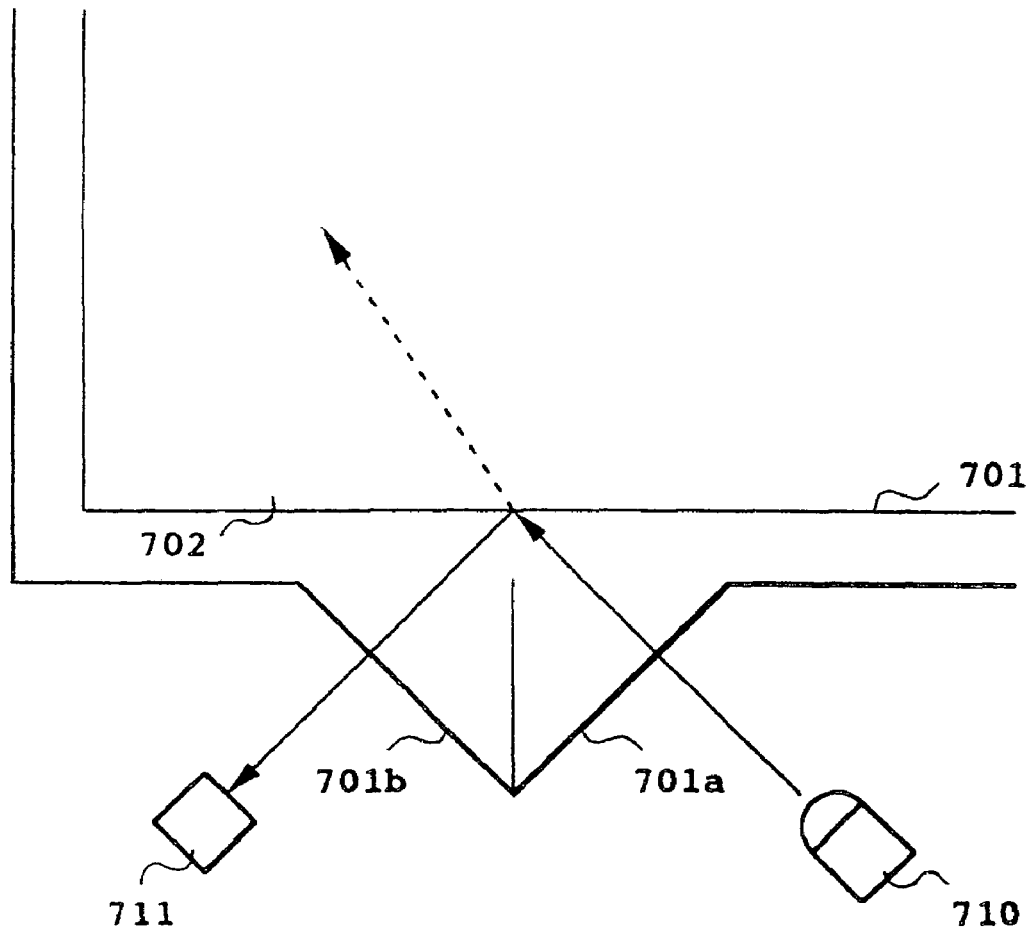
FIG. 8 is a schematic cross-sectional view of an ink tank and a device for detecting the presence or absence of ink to be applied in an ink-jet recording apparatus as one of the preferred embodiments of the present invention.

FIG. 8 is a schematic section view of an ink tank and an ink-detecting unit of the ink-jet recording apparatus as another preferred embodiment of the present invention. Inclined surfaces 701a, 701b are formed on the other side of the ink-flow wall 701 with respect to the ink-flow path 702. A light-emitting unit 710 is positioned so that the inclined surface 701a is almost perpendicular to the incident light, i.e., the light emitted from the light-emitting unit 710 enters into the inclined surface 701a, almost perpendicularly. On the other hand, a light-receptor unit 711 is positioned so that the inclined surface 701b is on a path of the total reflected light. In this case, there is no need to provide the inclined surface 701b as a plane perpendicular to the light path, but a detection without an influence of the reflection index of the light can be performed more stable as the relationship between the light path and the inclined surface 701b get closer to a right angle.

Embodiment 5

Figure 9:
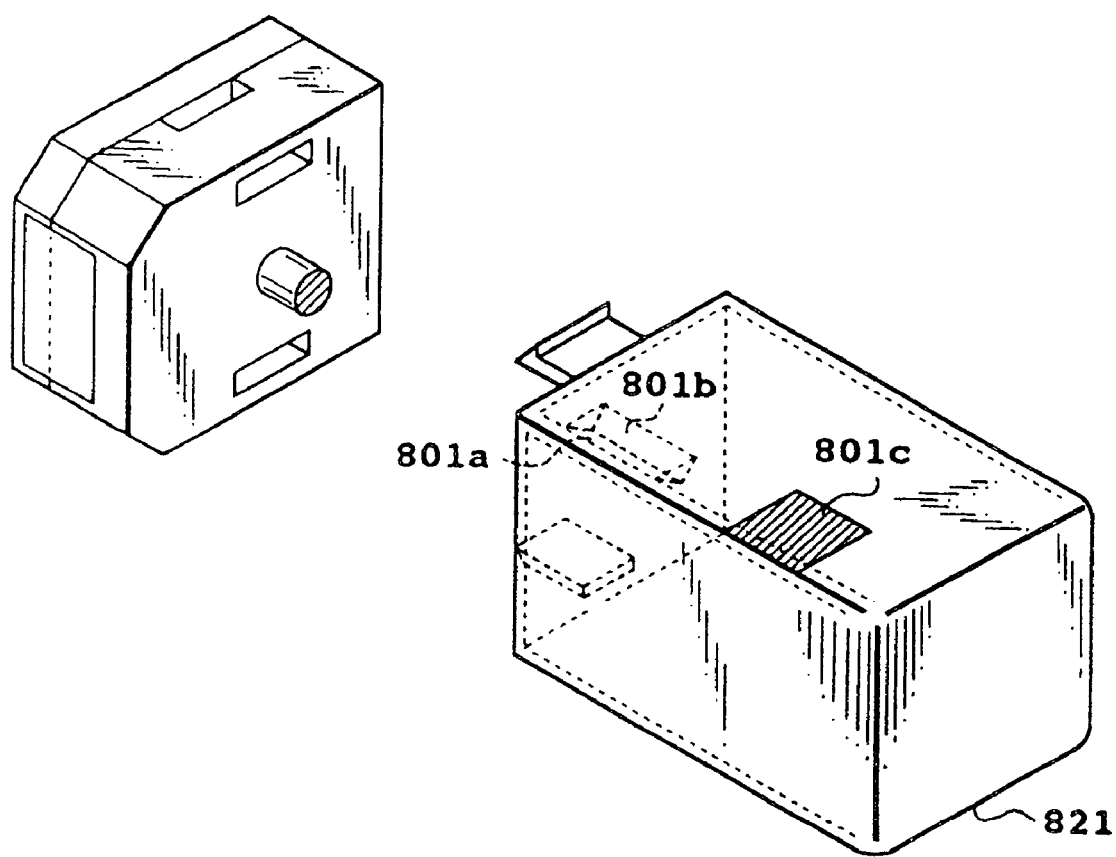
FIG. 9 is a perspective illustration of a recording unit to be mounted on an ink-jet recording apparatus as one of the preferred embodiments of the present invention.

FIG. 9 is a schematic section view of an ink-jet unit to be mounted on the ink-jet recording apparatus as another preferred embodiment of the present invention.

The inclined surfaces 801a, 801b are formed on a side surface of an ink tank 821. In addition, a light-reflective portion 801c is also formed on the same side surface.

Figure 10:
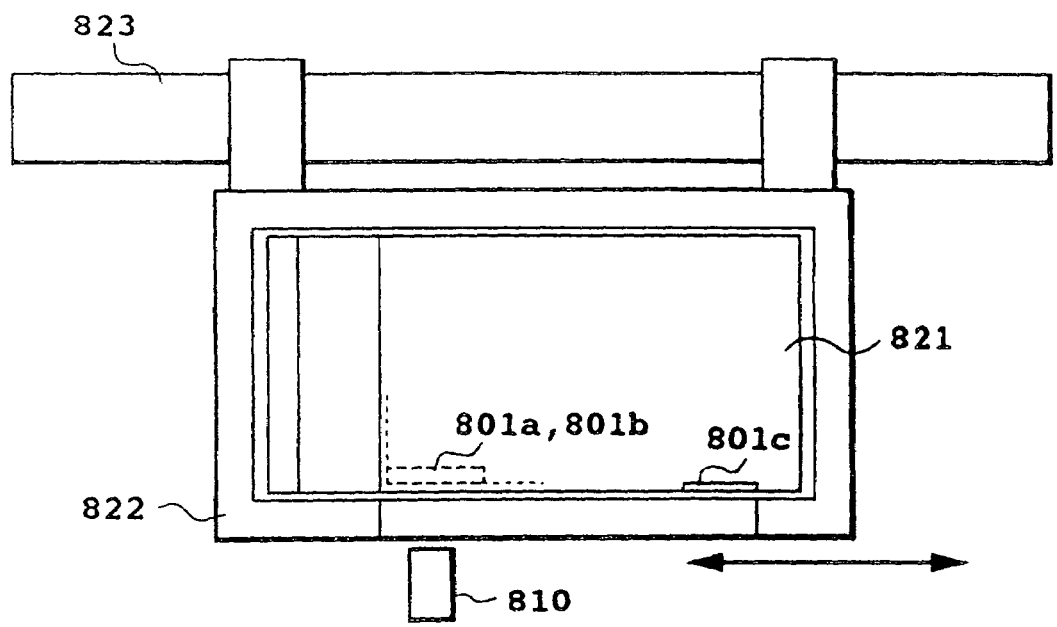
FIG. 10 is a schematic illustration of a carriage configuration in which a recording unit having an ink-jet recording head and an ink tank is mounted on the carriage.

FIG. 10 is a schematic illustration of a carriage on which the ink-jet unit having the ink-jet recording head and the ink tank shown in FIG. 9 is mounted. In the figure, reference numeral 810 denotes a photosensor unit as a combination of light-emitting portion and a light-receptor portion. The photosensor 810 is installed on a fixed portion formed on an outside of the carriage 822. When the carriage 822 travels along the carriage guide axis 823, the inclined surfaces 801a, 801b of the ink tank 821 and the light-reflective portion 801c face to the photosensor portion 810, respectively, according to the shifted positions of the carriage 822. Therefore, the absence or presence of the ink can be detected by facing the photosensor portion 810 to the inclined surfaces 801a, 801b, while the absence or presence of the ink tank on the carriage can be detected by facing the photosensor portion 810 to the light-reflective portion 801c. It means that the absence or presence of the ink and the absence or presence of the ink tank are detected by using only one common photoreceptor. By forming each surface of the ink tank as impenetrable by light except the inclined surfaces 801a, 801b, the light passes only through the inclined surfaces 801a, 801b. When the inclined surfaces 801a, 801b are covered with the ink (i.e., the ink level is higher than their positions), they do not reflect the incident light and so an inner side of the ink tank can be seen as a dark place by making visual observations through the surfaces 801a, 801b. When the inclined surfaces 801a, 801b are clear of the ink (i.e., the ink level is lower than their positions), they reflect the incident light and so an inner side of the ink tank can be seen as a light place by making visual observations through the surfaces 801a, 801b. Consequently, the absence or presence of the ink in the ink tank can be determined by observing those conditions. In the case that the incident light should be cut off from the ink tank, the absence or presence of the ink can be also detected by observing through the inclined surfaces.

Other Embodiments

A general construction of the ink-jet recording apparatus on which the ink tank and the ink detecting unit of one of the above embodiments 1 to 5 are mounted will be described below with reference to FIG. 11.

Figure 11:
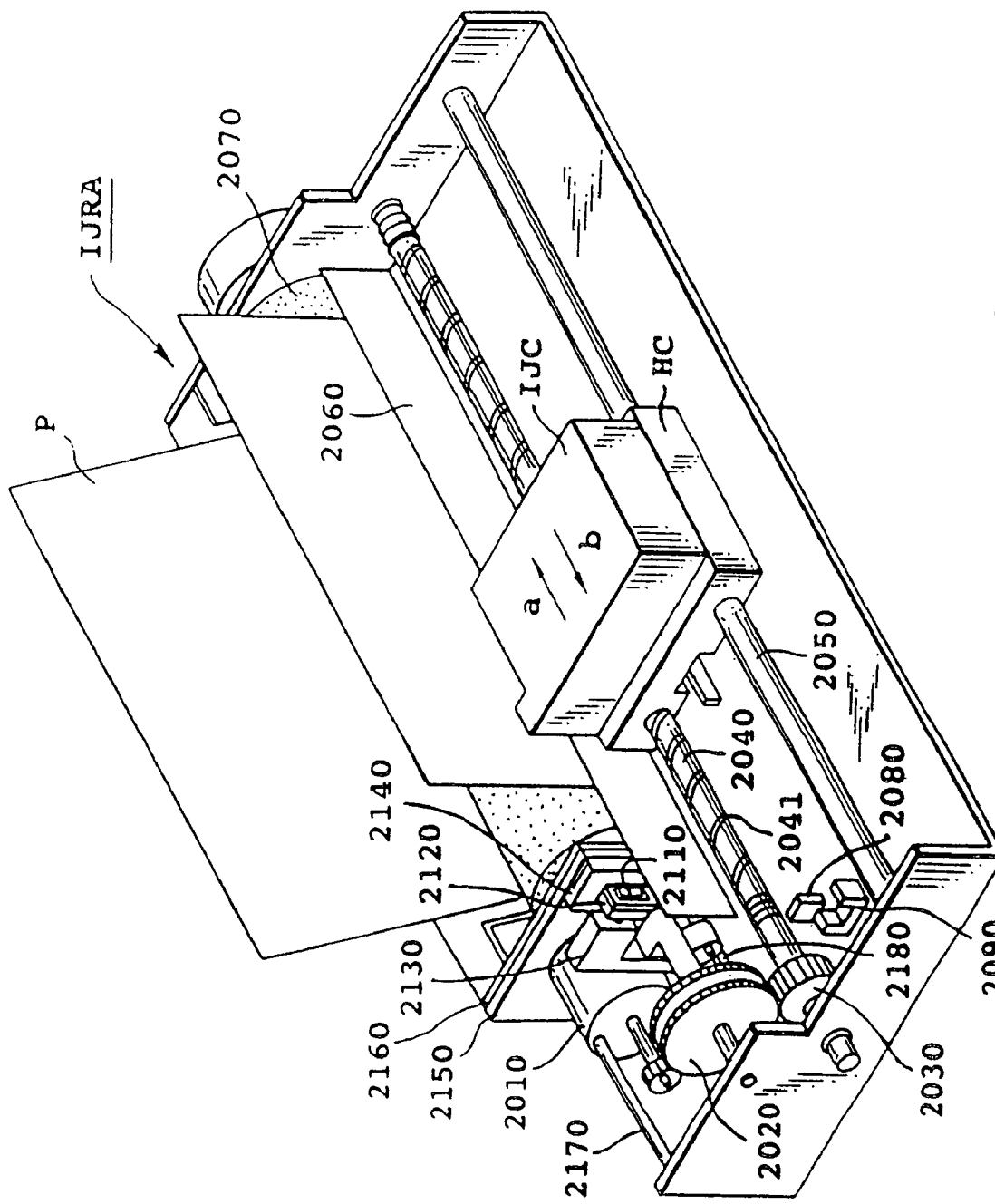
FIG. 11 is a perspective diagram of an ink-jet recording apparatus as one of the preferred embodiments of the present invention.

FIG. 11 is a schematic illustration of an ink-jet recording apparatus as one of the preferred embodiments of the present invention.

An ink-jet recording apparatus IJRA has a lead screw 2040 that rotates by working together with a normal or reverse rotation of a driving motor 2010 through a set of transmission gears 2020, 2030. A carriage HC on which an ink-jet cartridge is mounted is supported by a carriage shaft 2050 and the lead screw 2040. Also, the carriage has a pin (not shown) to be engaged in a spiral groove 2041 formed on a peripheral surface of the lead screw 2040 so as to move back and forth in the directions shown by the arrows a, b.

Reference numeral 2060 denotes a platen plate that positions the paper P and holds it against a platen roller 2070 in the direction of moving the carriage. Reference numeral 2080 and 2090 are photocouplers to be used as a home-position detecting means for changing a rotational direction of the motor 2010, and so on by recognizing that a lever 2100 arranged on the carriage HC is located at the position of these photocouplers.

A head recovering unit comprising a capping member 2110 and a sucking member 2130 is arranged at the position facing to one end of the path of displacement of the carriage HC, e.g., the position located opposite to a home position of the ink-jet cartridge IJC. As the driving force generated by the motor 2010 is transmitted via the power transmitting gears 2020, 2030, the head recovering unit is activated to cap the recording head with the cap member 2110 supported by a supporting member 2120. Subsequently, ink is sucked (to attain suction recovery) by driving the sucking member (e.g., suction pump) 2130 disposed in the head recovering unit in operative association with the capping member 2110, whereby ink located in the ink ejecting ports of the recording head with increased viscosity is forcibly discharged from the ink ejecting ports.

Reference numeral 2140 designates a cleaning blade for wiping an ejection surface of the recording head and it is held by a blade holding member 2160 so as to move back and forth. These members are arranged on a supporting plate 2160 of a main body.

Reference numeral 2170 designates a lever for starting a suction recovery. The lever 2170 moves with a movement of cam engaged with the carriage HC to control a driving force of the motor 2010 by producing variable or reciprocating motion in parts of transmission mechanism such as a clutch shifter.

Since a recording apparatus including an ink-jet recording head of the foregoing type makes it possible to perform a recording operation not only at a high density but also at a high speed, it is utilized and commercialized as outputting means for a recording system, e.g., a printer serving as an output terminal unit for a copying machine, a facsimile, an electronic typewriter, a word processor, a work station or the like or a handy or portable type printer to be equipped in an information processing system such as a personal computer, a host computer, an optical disc unit, a video unit or the like. In the circumstances as mentioned above, an ink-jet recording apparatus is constructed in such a manner as to match with a function and a type of practical use inherent to each of the aforementioned units.

In the case of a color ink-jet recording apparatus for printing in two or more colors, a multicolor image is formed by allowing ink droplets to overlap one above another on a recording medium by ejecting inks of several colors from a plurality of color ink-jet recording heads or by an arrangement of colors into rows and columns of a matrix (N×N) on the recording medium. Generally, in the case that a color recording operation is performed with the color ink-jet recording apparatus, three or four ink-jet recording heads and three or four ink cartridges corresponding to three primary colors composed of yellow (Y), magenta (M) and cyan (C) or four colors composed of three primary colors and black (B). Lately, a color ink-jet recording apparatus having three or four kinds of color ink-jet recording heads mounted thereon so as to enable an image to be formed with full color has been put in practical use.

In addition, the foregoing type of color ink-jet recording apparatus can be constructed in such a manner as to enable an image to be comparatively easily recorded on a recording medium with a size of "A-1". Concretely, a color ink-jet recording apparatus electrically connected to a reader adapted to read a A-1 sized original of multicolor image so as to allow the original to be recorded on a recording paper, e.g., a plotter serving as a CAD output printer has been commercialized. On the other hand, it is practically required that the color ink-jet recording apparatus can be used in a variety of fashions, and lately, requests have been increasingly raised from users for providing a color ink-jet recording apparatus capable of recording various kinds of information such as characters, graphs, pictures, and figures on an OHP film in order to visually project the information on a screen for the presentation in a conference or lecture.

We are now explaining a recording system that performs a recording on a recording medium by using a liquid-ejecting head as a recording head.

Figure 12:
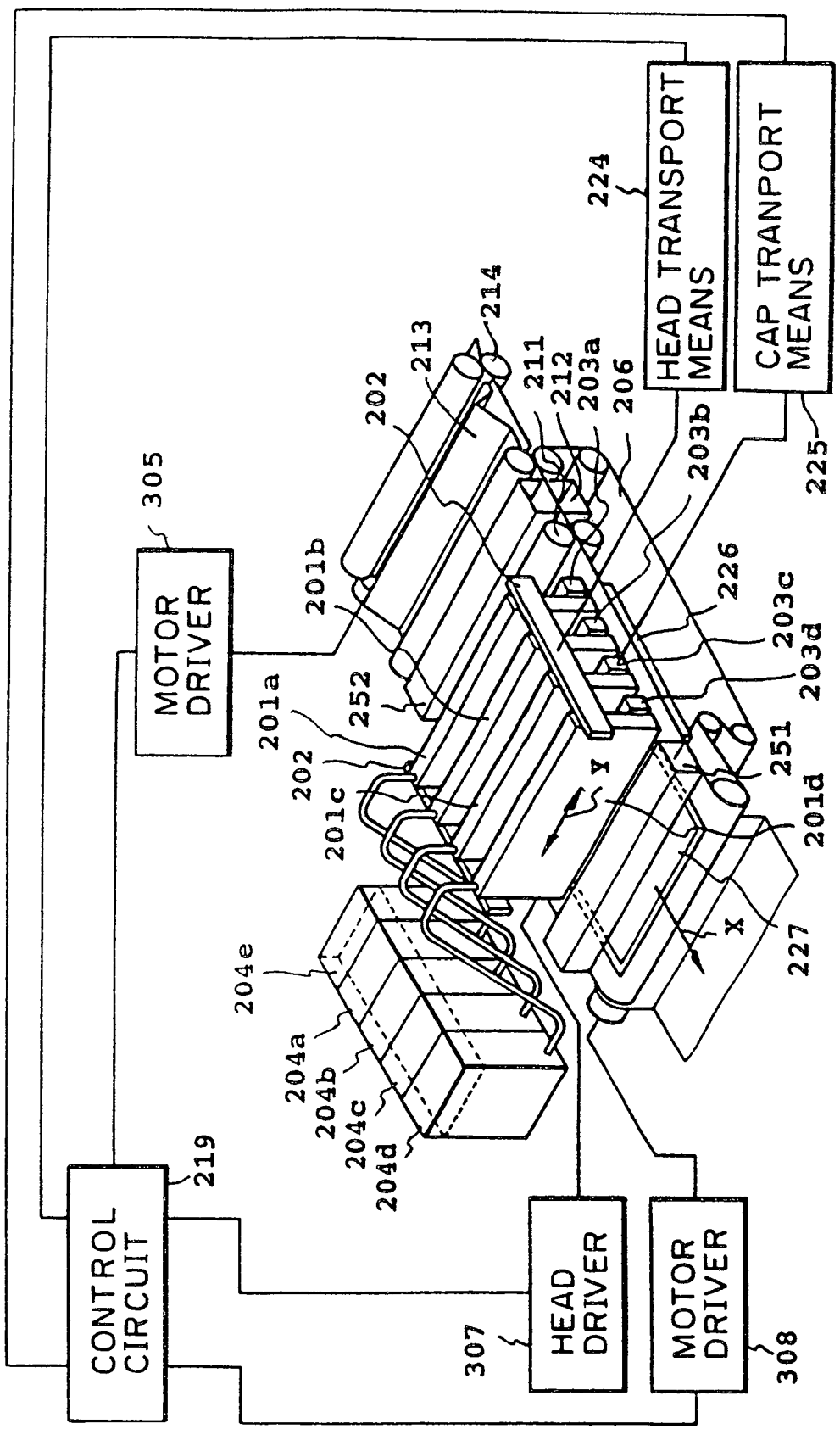
FIG. 12 is a perspective diagram of an information-processing system as one of the preferred embodiments of the present invention.

FIG. 12 is a schematic illustration of the recording system as a preferred embodiment of the present invention. In this embodiment, a liquid-ejection head is of a full-line type with a length thereof corresponding to a recording width of the recording medium 150. The liquid-ejection head comprises a plurality of orifices with pitches of 360 dpi in the direction of length. In the liquid-ejection head, there is a holder 202 for folding four heads corresponding to four different colors: yellow (Y), magenta (M), cyan (C), and black (Bk), respectively. These color heads are arranged in parallel with predetermined spacing in the direction of arrow X.

Each of these color heads receives signals from a head driver 307 comprised in the driving signal supplying means, and thus they are driven according to their corresponding signals, respectively. In addition, the color heads receive color ink of Y, M, C, and Bk from ink tanks 204a-204d, respectively.

Furthermore, reference numeral 204e denotes a container for storing a blowing solution, so that each of the color heads is configured to receive a supply of the blowing solution from the container 204e. In this embodiment, these ink tanks 204a-204d and the container 204e have window portions (not shown) as the same as any one of the above embodiments 1 to 5. The window portion of each tank or container is arranged so as to face to a corresponding device for determining the absence or presence of a liquid.

Head caps 203a-203d, in which ink-absorbing materials such as sponges are imbedded, are arranged below the color heads, respectively, for their protection by covering each head with each corresponding head cap at the period of non-recording.

Reference numeral 206 denotes a feed belt as a means for transmitting the recording material. The feed belt is routed round various kinds of rollers in a predetermined path and driven by a drive roller connected with a motor driver 305.

In the recording system of the present embodiment, various kinds of treatments can be down on the recording medium, before and after the recording. Thus the recording system comprises a pre-treatment device 251 for treating the recording medium prior to the step of recording and a post-treatment device 252 for treating the recording medium subsequent to the step of recording. The pre-treatment device 251 is arranged in the downstream of a path of feeding the recording medium, while the post-treatment device 252 is arranged in the upstream thereof.

The contents of the pre- and post-treatments are varied according to the variations of ink or recording media to be used for the recording process, for example the application of UV and ozone is performed on a recording medium made of metal, plastic, ceramic, or the like to activate a surface thereof for improving the adherence. In the case of using a recording medium having a static-prone surface, such as a sheet of plastic material, debris may be easily to adhere thereon to prevent the formation of an excellent image by the contaminated surface. The recording medium may be guarded against static buildup with an ionizer as the pre-treatment to remove the debris from the recording medium. In the case of using a textile- or fabric-based recording medium, it is preferable to perform a pre-treatment of one selected from the group of alkaline materials, water-soluble materials, synthetic polymers, water-soluble metallic salts, urea, and thiourea from the points of, for example preventing shrinkage and improving the degree of exhaustion. It is noted that the pre-treatment procedures are not restricted by the above ways. It is also possible to adopt other procedures, for example a pre-treatment having the step of heating the recording medium at a temperature preferable to the recording.

For the post-treatment, on the other hand, there are several treatments can be performed, for example: a fixation for fixing ink applied on the recording medium by means of UV irradiation or by means of heat; and a washing fro removing a remaining unreact material used in the pre-treatment.

Accordingly, the ink-jet recording apparatus of the present invention can be used as one superior to the others in many industrial fields (e.g., apparel industries) and provides images with excellent image qualities compared with that of the conventional one.

By the way, as described above, the ink tank can be removably connected with the ink-jet recording head to form a recording unit in a one-piece design. Thus it can be introduced in the market. In accordance with the present invention, therefore it is also possible to provide an ink refill means for replenishing the ink tank with ink.

Figure 13:
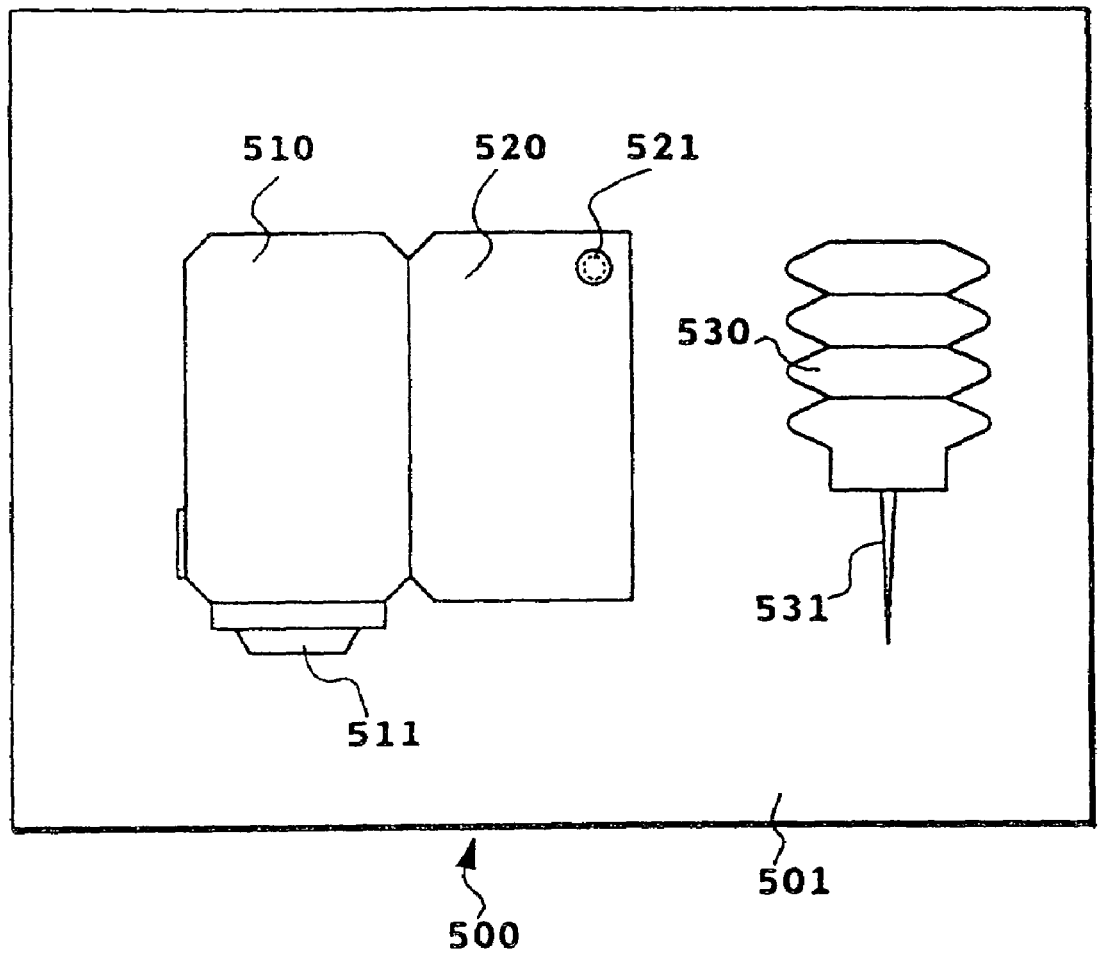
FIG. 13 is an ink-jet head kit comprising a recording head unit and an ink refill device.

FIG. 13 is a schematic illustration of an ink-jet head kit provided as a set of a recording unit and an ink refill device. That is, a kit container 501 comprises an ink-jet recording head 510 having an ink ejection portion 511 for ejecting ink, an ink tank 520 as a liquid container which is stationary or removably connected with the ink head 510, and an ink refill device 530 for refilling ink into the ink tank 510.

After using the ink up, ink may be refilled in the ink tank through an insert portion (e.g., injection needle) 531 of the ink refill device. That is, the insert portion 531 of the ink refill device is inserted into a hole made on a wall or an air communicating port 521 of the ink tank, or a connected portion between the ink tank and the recording head.

In accordance with the present invention, as described above, the ink-jet kit combines the ink-jet recording head, the ink tank having the configuration of one of the above embodiments, and the ink refill device into a container of compact design. In the case of using the ink up, therefore, the recording can be easily carried out again without much times by refilling ink into the ink tank by using the above kit.

As explained above, the device for detecting the presence or absence of a liquid, ink tank, kit, recording unit, recording apparatus, and recording system constructed by the connection with the information processing device of the present invention are configured to determine the presence or absence of ink in the ink flow path by detecting the reflection of light from a light transmission portion by irradiating light thereon. The light transmission portion is formed on at least a part of the ink path wall that forms the ink flow path for supplying ink to the recording head. As a result, it becomes possible for responding to consumer demands of designing a smaller version of the ink tank, a cost effective production thereof, and the like in addition to provide images with excellent image qualities.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink tank for supplying ink to recording means that ejects ink and is fixed on or removably mounted on a recording apparatus for recording input image information on a recording medium using the recording means, said ink tank comprising:

a casing forming a chamber for storing the ink, said casing having a plurality of rectangular walls;

an engagement member by which said ink tank engages with the recording means, said engagement member extending outwardly from a first one of said walls;

a first reflecting portion having two surfaces configured to reflect an amount of incident light from outside said ink tank according to an amount of ink in said ink tank, said first reflecting portion being arranged at a predetermined position on a second one of said walls, said two surfaces being formed at predetermined angles with respect to said second wall to form a dihedral angle having a vertex line parallel to said second wall, the vertex line being parallel to a longitudinal direction of said second wall; and a second reflecting portion reflecting incident light from outside said ink tank, said second reflecting portion being arranged at a position shifted from a position of said first reflecting portion along a direction of the vertex line, wherein said second wall is different from said first wall, on which said engagement member is provided, and said engagement member has a shape projecting from said first wall in a direction parallel to the vertex line, and wherein said ink tank engages with the recording means by moving said ink tank in a direction parallel to the longitudinal direction of said second wall.

2. An ink tank as claimed in claim 1, wherein the recording means comprises an ink-jet recording head that uses an electrothermal transducer for generating thermal energy required for allowing a phenomenon of film boiling to occur in ink in order to eject ink therefrom.

3. An ink tank as claimed in claim 1, wherein two parallel edges of said second wall are parallel to the vertex line.

4. An ink tank as claimed in claim 1, wherein each of said two surfaces is rectangular, and longer edges of said two surfaces are parallel to the longitudinal direction of said second wall.

5. A recording unit comprising an ink tank and recording means that ejects ink supplied by said ink tank, said recording means being fixed on or removably mounted on a recording apparatus for recording input image information on a recording medium using said recording means, said ink tank comprising:

a casing forming a chamber for storing the ink, said casing having a plurality of rectangular walls;

an engagement member by which said ink tank engages with said recording means, said engagement member extending outwardly from a first one of said walls;

a first reflecting portion having two surfaces configured to reflect an amount of incident light from outside said ink tank according to an amount of ink in said ink tank, said first reflecting portion being arranged at a predetermined position on a second one of said walls, said two surfaces being formed at predetermined angles with respect to said second wall to form a dihedral angle having a vertex line parallel to said second wall, the vertex line being parallel to a longitudinal direction of said second wall; and a second reflecting portion reflecting incident light from outside said ink tank, said second reflecting portion being arranged at a position shifted from a position of said first reflecting portion along a direction of the vertex line, wherein said second wall is different from said first wall, on which said engagement member is provided, and said engagement member has a shape projecting from said first wall in a direction parallel to the vertex line, and wherein said ink tank engages with said recording means by moving said ink tank in a direction parallel to the longitudinal direction of said second wall.

6. A recording unit as claimed in claim 5, wherein said recording means comprises an ink-jet recording head that uses an electrothermal transducer for generating thermal energy required for allowing a phenomenon of film boiling to occur in ink in order to eject ink therefrom.

* * * * *